United States Patent
Watanabe

(10) Patent No.: US 12,086,081 B2
(45) Date of Patent: Sep. 10, 2024

(54) ELECTRONIC DEVICE CONNECTABLE TO A DETACHABLE DEVICE, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Tatsuya Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 679 days.

(21) Appl. No.: 17/211,620

(22) Filed: Mar. 24, 2021

(65) Prior Publication Data

US 2021/0303485 A1 Sep. 30, 2021

(30) Foreign Application Priority Data

Mar. 27, 2020 (JP) .................. 2020-058306

(51) Int. Cl.
 - *G06F 13/16* (2006.01)
 - *G06F 3/06* (2006.01)
 - *G06T 1/60* (2006.01)

(52) U.S. Cl.
CPC ........ *G06F 13/1668* (2013.01); *G06F 3/0604* (2013.01); *G06T 1/60* (2013.01); *G06F 3/0659* (2013.01); *G06F 3/0673* (2013.01)

(58) Field of Classification Search
CPC .. G06F 13/1668; G06F 13/124; G06F 3/0601; G06F 3/0602; G06F 3/0659; G06F 3/0673

See application file for complete search history.

(56) References Cited

U.S. PATENT DOCUMENTS

| | | | | |
|---|---|---|---|---|
| 2005/0237396 | A1* | 10/2005 | Hagiwara | H04N 5/907 386/E5.067 |
| 2011/0074970 | A1* | 3/2011 | Sukegawa | H04N 23/61 348/222.1 |
| 2011/0078393 | A1* | 3/2011 | Lin | G06F 3/0679 711/155 |
| 2012/0254796 | A1* | 10/2012 | Tan | H04N 1/00347 715/810 |
| 2019/0079702 | A1* | 3/2019 | Yeon | G11C 16/04 |
| 2019/0122064 | A1* | 4/2019 | Ishikawa | H04N 23/80 |
| 2021/0326251 | A1* | 10/2021 | Date | G06F 3/08 |

FOREIGN PATENT DOCUMENTS

| | | |
|---|---|---|
| JP | 2013-144037 A | 7/2013 |
| JP | 2015-046927 A | 3/2015 |

* cited by examiner

*Primary Examiner* — Tracy A Warren
(74) *Attorney, Agent, or Firm* — Cowan, Liebowitz & Latman, P.C.

(57) ABSTRACT

An electronic device capable of attaching/detaching a device including an arithmetic processing unit: divides data that is a processing target of the arithmetic processing unit to obtain a plurality of divided data; determines a first command group that is a combination of a plurality of types of commands used to transmit each of the plurality of divided data to the device; and transmits the divided data using the determined first command group. The electronic device changes a combination of commands that form the first command group between a case in which certain divided data of the plurality of divided data is transmitted and a case in which another divided data is transmitted.

20 Claims, 13 Drawing Sheets

FIG. 7A

| START bit | Direction bit | COMMAND NUMBER | COMMAND ARGUMENT | ERROR CORRECTION DATA | END bit |
|---|---|---|---|---|---|
| 702 | 703 | 704 | 705 | 706 | 707 |

| START bit | Direction bit | RESPONSE NUMBER | RESPONSE ARGUMENT | ERROR CORRECTION DATA | END bit |
|---|---|---|---|---|---|
| 712 | 713 | 714 | 715 | 716 | 717 |

711

F I G. 13

| PROCESSING CLASSIFICATION | INPUT SIZE | INPUT DATA COUNT | ESTIMATED PROCESSING TIME | PROCESSING RESULT DATA COUNT | ANALYSIS RESULT STORAGE ADDRESS |
|---|---|---|---|---|---|
| ANALYSIS PROCESSING A | 64 x 64 | 20 BLOCKS | 100 ns | 16 BLOCKS | 0xFFFFFFFF |
| ANALYSIS PROCESSING B | 32 x 32 | 30 BLOCKS | 512 ns | 32 BLOCKS | 0xEEEEEEEE |
| ANALYSIS PROCESSING C | 16 x 16 | 40 BLOCKS | 100 µs | 48 BLOCKS | 0xAAAAAAAA |
| ANALYSIS PROCESSING D | 8 x 8 | 80 BLOCKS | 4 ms | 64 BLOCKS | 0xBBBBBBBB |
| ... | ... | ... | ... | ... | ... |

ELECTRONIC DEVICE CONNECTABLE TO
A DETACHABLE DEVICE, CONTROL
METHOD THEREOF, AND
NON-TRANSITORY COMPUTER-READABLE
STORAGE MEDIUM

BACKGROUND OF THE INVENTION

Field of the Invention

The present invention relates to an electronic device connectable to a detachable device, a control method thereof, and a non-transitory computer-readable storage medium.

Description of the Related Art

In recent years, image analysis of performing object detection and tracking or performing attribute estimation, and estimation of the number of objects using the result of such image analysis are performed in various scenes using images captured by a monitoring camera. In general, image analysis is performed by transferring videos from the monitoring camera to a high performance arithmetic apparatus such as a PC or a server. However, along with the improvement of the processing capability of mobile arithmetic apparatuses, cases in which image analysis is directly performed on the camera side are increasing. As an implementation form in a case in which image analysis is directly performed on the camera side, an arithmetic apparatus is arranged in a camera main body. Also, a form in which an arithmetic apparatus is arranged in a detachable device such as an USB is also proposed. In the form in which an arithmetic apparatus is arranged in the camera main body, a detachable device in which an arithmetic apparatus is arranged is attached, thereby performing more advanced analysis processing on the camera side.

However, if the camera and the detachable device are connected using a general-purpose I/F, a protocol used in the communication is known. For this reason, data may easily be analyzed. Japanese Patent Laid-Open No. 2015-046927 (to be referred to as patent literature 1 hereinafter) discloses a communication setting method of exchanging information for communication setting using encryption when establishing communication. Japanese Patent Laid-Open No. 2013-144037 (to be referred to as patent literature 2 hereinafter) discloses a method of connecting devices by a plurality of I/Fs (a plurality of communication paths), encrypting information by the number of communication paths, and decrypting the encrypted information.

In the conventional technique disclosed in patent literature 1 described above, there is a description about an authentication method for establishing a communication method, but there is no mention about a data transmission/reception method after communication establishment. In the conventional technique disclosed in patent literature 2 described above, there is a description about a method of encrypting data, but there is no mention about analyzing the protocol itself of the I/F between devices.

SUMMARY OF THE INVENTION

The present invention provides a technique of reducing the possibility that the communication contents between an electronic device and a device, which are connected using a known communication protocol, are confirmed by a third party.

According to one aspect of the present invention, there is provided an electronic device capable of attaching/detaching a device including an arithmetic processing unit, comprising: a dividing unit configured to divide data that is a processing target of the arithmetic processing unit to obtain a plurality of divided data; a determining unit configured to determine a first command group that is a combination of a plurality of types of commands used to transmit each of the plurality of divided data to the device; and a transmitting unit configured to transmit the divided data using the first command group determined by the determining unit, wherein the determining unit changes a combination of commands that form the first command group between a case in which certain divided data of the plurality of divided data is transmitted and a case in which another divided data is transmitted.

According to another aspect of the present invention, there is provided an electronic device capable of attaching/detaching a device including a storage unit, comprising: a determining unit configured to determine a command group that is a combination of a plurality of types of commands used to read out data from the storage unit; and a reading unit configured to read out data of a read target from the storage unit by executing read processing of reading out data from the device using a command of the command group a plurality of times, wherein the determining unit changes the combination of the plurality of types of commands that form the command group between the read processing of reading out certain data of the data of the read target and the read processing of reading out another data.

According to another aspect of the present invention, there is provided a control method of an electronic device capable of attaching/detaching a device including an arithmetic processing unit, the method comprising: dividing data that is a processing target of the arithmetic processing unit to obtain a plurality of divided data; determining a first command group that is a combination of a plurality of types of commands used to transmit each of the plurality of divided data to the device; and transmitting the divided data using the first command group, wherein in the determining, a combination of commands that form the first command group is changed between a case in which certain divided data of the plurality of divided data is transmitted and a case in which another divided data is transmitted.

According to another aspect of the present invention, there is provided a control method of an electronic device capable of attaching/detaching a device including a storage unit, the method comprising: determining a command group that is a combination of a plurality of types of commands used to read out data from the storage unit; and reading out data of a read target by executing read processing of reading out data from the device using the command group a plurality of times, wherein in the determining, the combination of the plurality of types of commands that form the command group is changed between the read processing of reading out certain data of the data of the read target and the read processing of reading out another data.

According to another aspect of the present invention, there is provided a non-transitory computer-readable storage medium storing a program configured to cause a computer to execute a control method of an electronic device capable of attaching/detaching a device including an arithmetic processing unit, the method comprising: dividing data that is a processing target of the arithmetic processing unit to obtain a plurality of divided data; determining a first command group that is a combination of a plurality of types of commands used to transmit each of the plurality of divided data to the device; and transmitting the divided data using the first command group, wherein in the determining, a combination of commands that form the first command group is changed between a case in which certain divided data of the plurality of divided data is transmitted and a case in which another divided data is transmitted.

According to another aspect of the present invention, there is provided a non-transitory computer-readable storage medium storing a program configured to cause a computer to execute a control method of an electronic device capable of attaching/detaching a device including a storage unit, comprising: determining a command group that is a combination of a plurality of types of commands used to read out data from the storage unit; and reading out data of a read target by executing read processing of reading out data from the device using the command group a plurality of times, wherein in the determining, the combination of the plurality of types of commands that form the command group is changed between the read processing of reading out certain data of the data of the read target and the read processing of reading out another data.

Further features of the present invention will become apparent from the following description of exemplary embodiments with reference to the attached drawings.

BRIEF DESCRIPTION OF THE DRAWINGS

FIGS. 7A and 7B are views showing the structure of a command and a response;

FIG. 13 is a view showing an example of information obtained by an imaging apparatus.

DESCRIPTION OF THE EMBODIMENTS

Figure 1:
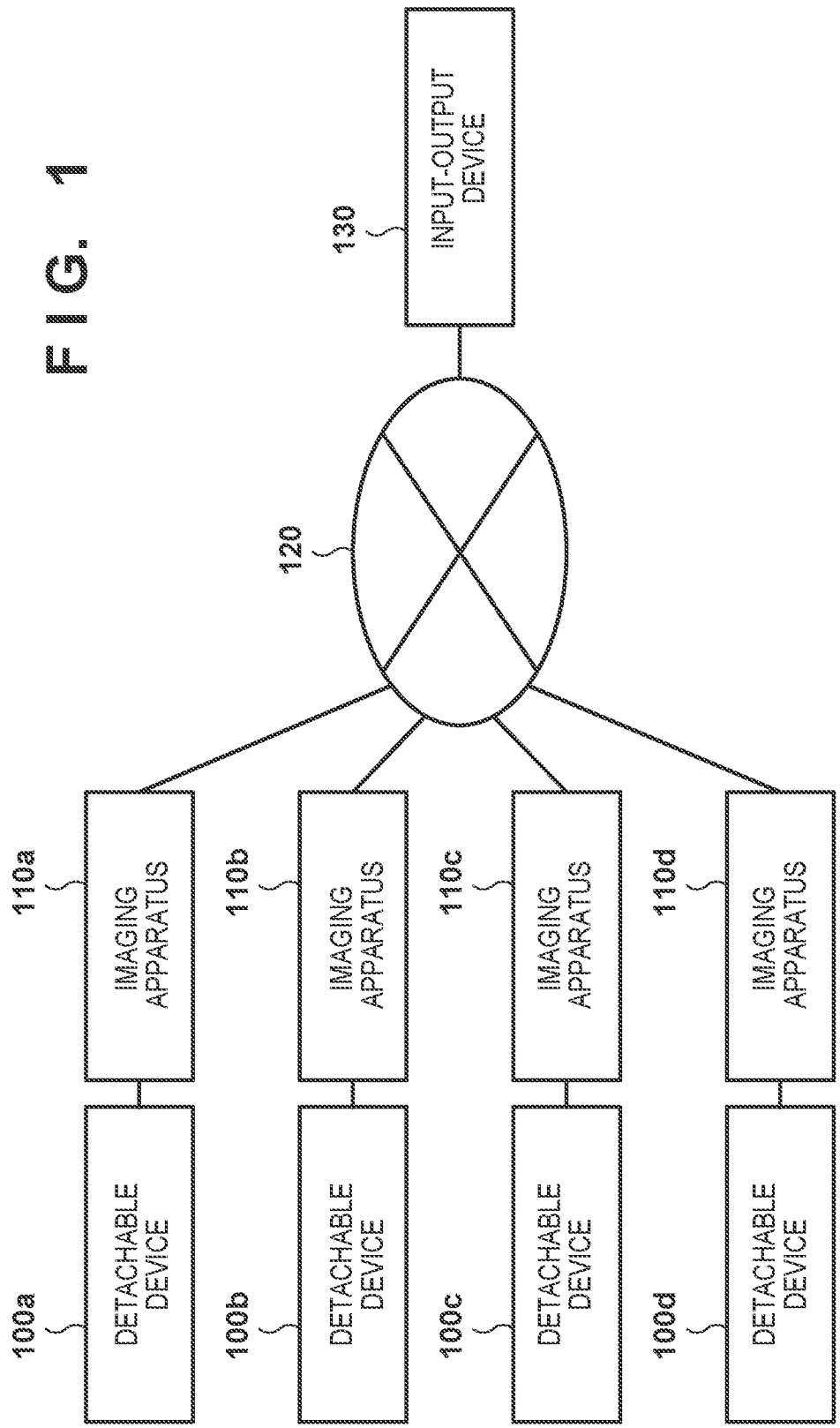
FIG. 1 is a block diagram showing an example of a system arrangement according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

An example in which an imaging apparatus is used as an electronic device to which detachable device is attached will be described below.
<System Arrangement>

FIG. 1 shows an example of the arrangement of an image analysis system according to this embodiment. As an example, a case in which this system is a specific person tracking system will be described below. However, the present invention is not limited to this, and the following argument can be applied to an arbitrary system for analyzing an image and performing predetermined information output. This system is configured to include imaging apparatuses 110a to 110d, a network 120, and an input-output device 130. Note that the imaging apparatuses 110a to 110d each include a slot to/from which a device capable of recording, for example, a captured image can be attached/detached. When the detachable devices 100a to 100d are inserted into the slots, the imaging apparatuses 110a to 110d are connected to the detachable devices 100a to 100d. Note that the detachable devices 100a to 100d will be referred to as "detachable devices 100", and the imaging apparatuses 110a to 110d will be referred to as "imaging apparatuses 110" hereinafter. Note that the term "image" generally indicates a video, a moving image, and a still image.

The detachable device 100 is an arithmetic device attachable/detachable to/from the imaging apparatus 110. As an example, the detachable device 100 is a memory device with a predetermined processing circuit mounted in an SD card. The detachable device 100 is configured to be inserted as a whole into the imaging apparatus 110 in a form of, for example, an SD card, and can therefore be configured to be connectable to the imaging apparatus 110 without making any portion project from the imaging apparatus 110. Alternatively, the detachable device 100 may be configured such that, for example, a half or more of it can be inserted into the imaging apparatus 110, and may therefore be configured to be connectable to the imaging apparatus 110 while making a portion project a little from the imaging apparatus 110. This can prevent the detachable device 100 from interfering with an obstacle such as a wiring and raise the convenience when using the device. In addition, since an SD card slot is prepared in a lot of existing imaging apparatuses 110 such as a network camera, the detachable device 100 can provide an extension function to the existing imaging apparatus 110. Note that the form of the detachable device 100 is not limited to the form of an SD card. For example, the detachable device 100 may be configured to be attached to the imaging apparatus 110 via an arbitrary interface used when attaching a storage device capable of storing an image captured by at least the imaging apparatus 110. For example, the detachable device 100 may include a USB (Universal Serial Bus) interface, and may be configured to be attached to a USB socket of the imaging apparatus 110. The predetermined processing circuit is implemented by, for example, an FPGA (Field Programmable Gate Array) programmed to execute predetermined processing but may be implemented in another form.

The imaging apparatus 110 is an imaging apparatus such as a network camera. In this embodiment, the imaging apparatus 110 incorporates an arithmetic apparatus capable of processing an image but is not limited to this. For example, an external computer such as a PC (Personal Computer) connected to the imaging apparatus 110 may exist, and the combination may be handled as the imaging apparatus 110. Additionally, in this embodiment, the detachable devices 100 are attached to all the imaging apparatuses 110. Note that FIG. 1 shows four imaging apparatuses 110, and the detachable devices attached to these. The number of combinations of devices may be three or less, or five or more. When the detachable device 100 having an image analysis processing function is attached to the imaging apparatus 110, image processing can be executed on the side of the imaging apparatus 110 even if the imaging apparatus 110 does not have the image analysis processing function. Also, in a form in which an arithmetic apparatus for image processing is arranged in the imaging apparatus 110, as in this embodiment, image processing executable on the side of the imaging apparatus 110 can be diversified/sophisticated by attaching the detachable device 100 including an arithmetic apparatus to the imaging apparatus 110.

The input-output device 130 is an apparatus that performs acceptance of input from a user and output of information (for example, display of information) to the user. In this embodiment, for example, the input-output device 130 is a computer such as a PC, and information is input/output by a browser or a native application installed in the computer.

The imaging apparatuses 110 and the input-output device 130 are communicably connected via the network 120. The network 120 is configured to include a plurality of routers, switches, cables, and the like, which satisfy the communication standard of, for example, Ethernet®. In this embodiment, the network 120 can be an arbitrary network that enables communication between the imaging apparatus 110 and the input-output device 130, and can be constructed by an arbitrary scale and arrangement and a communication standard to comply with. For example, the network 120 can be the Internet, a wired LAN (Local Area Network), a wireless LAN, a WAN (Wide Area Network), or the like. The network 120 can be configured such that, for example, communication by a communication protocol complying with the ONVIF (Open Network Video Interface Forum) standard is possible. However, the network 120 is not limited to this and may be configured such that, for example, communication by another communication protocol such as a unique communication protocol is possible.

<Apparatus Arrangement>
(Arrangement of Imaging Apparatus)

Figure 2:
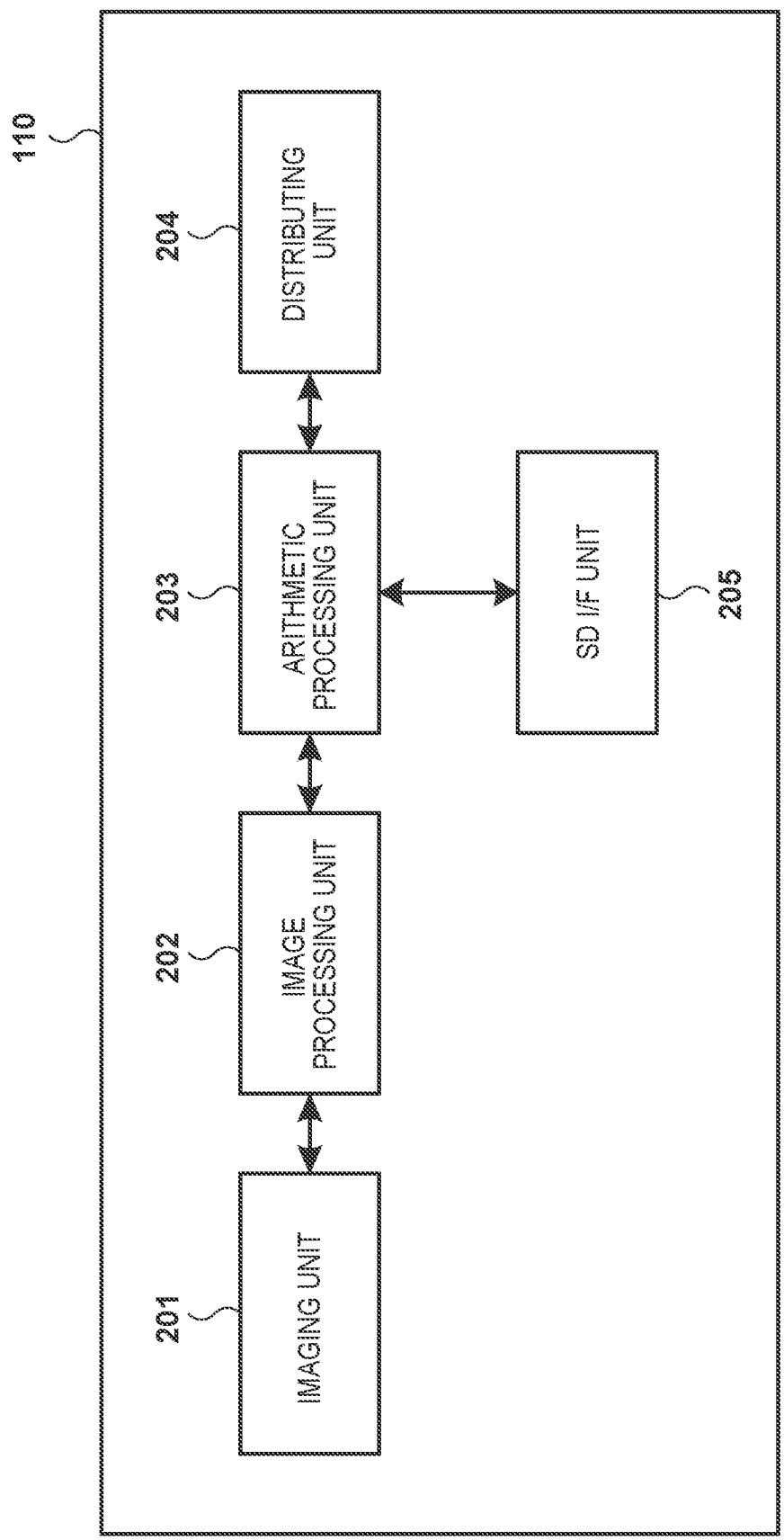
FIG. 2 is a block diagram showing an example of the hardware arrangement of an imaging apparatus.

The arrangement of the imaging apparatus 110 will be described next. FIG. 2 is a block diagram showing an example of the hardware arrangement of the imaging apparatus 110. As the hardware arrangement, the imaging apparatus 110 includes, for example, an imaging unit 201, an image processing unit 202, an arithmetic processing unit 203, a distributing unit 204, and an SD I/F unit 205. Note that I/F is an abbreviation of interface.

The imaging unit 201 is configured to include a lens portion configured to form an image of light, and an imaging element that performs analog signal conversion according to the formed image of light. The lens portion has a zoom function of adjusting an angle of view, a stop function of adjusting a light amount, and the like. The imaging element has a gain function of adjusting sensitivity when converting light into an analog signal. These functions are adjusted based on set values notified from the image processing unit 202. The analog signal obtained by the imaging unit 201 is converted into a digital signal by an analog-to-digital conversion circuit and transferred to the image processing unit 202 as an image signal.

The image processing unit 202 is configured to include an image processing engine, and peripheral devices thereof. The peripheral devices include, for example, a RAM (Random Access Memory), the drivers of I/Fs, and the like. The image processing unit 202 performs, for example, image processing such as development processing, filter processing, sensor correction, and noise removal for the image signal obtained from the imaging unit 201, thereby generating image data. The image processing unit 202 can also transmit set values to the lens portion and the imaging element and execute exposure adjustment to obtain an appropriately exposed image. The image data generated by the image processing unit 202 is transferred to the arithmetic processing unit 203.

The arithmetic processing unit 203 is formed by at least one processor such as a CPU or an MPU, memories such as a RAM and a ROM, the drivers of I/Fs, and the like. Note that CPU is the acronym of Central Processing Unit, MPU is the acronym of Micro Processing Unit, RAM is the acronym of Random Access Memory, and ROM is the acronym of Read Only Memory. In an example, the arithmetic processing unit 203 can determine allocation concerning which one of the imaging apparatus 110 and the detachable device 100 should execute each portion of processing to be executed in the above-described system, and execute processing corresponding to the determined allocation. Also, the arithmetic processing unit 203 performs protocol control of SD communication complying with the SD standard (formulated by the SD Association) with the detachable device 1M. Details of the SD communication protocol control function will be described later. The image received from the image processing unit 202 is transferred to the distributing unit 204 or the SD I/F unit 205. The data of the processing result is also transferred to the distributing unit 204.

The distributing unit 204 is configured to include a network distribution engine and, for example, peripheral devices such as a RAM and an ETH PHY module. The ETH PHY module is a module that executes processing of the physical (PHY) layer of Ethernet. The distributing unit 204 converts the image data or the data of the processing result obtained from the arithmetic processing unit 203 into a format distributable to the network 120, and outputs the converted data to the network 120. The SD I/F unit 205 is an interface portion used to connect the detachable device 100, and is configured to include, for example, a power supply, and an attachment mechanism such as an attaching/detaching socket used to attach/detach the detachable device 100. Here, the SD I/F unit 205 is configured in accordance with the SD standard formulated by the SD Association. Communication between the detachable device 100 and the imaging apparatus 110, such as transfer of an image obtained from the arithmetic processing unit 203 to the detachable device 100 or data obtaining from the detachable device 100, is performed via the SD I/F unit 205.

Figure 3:
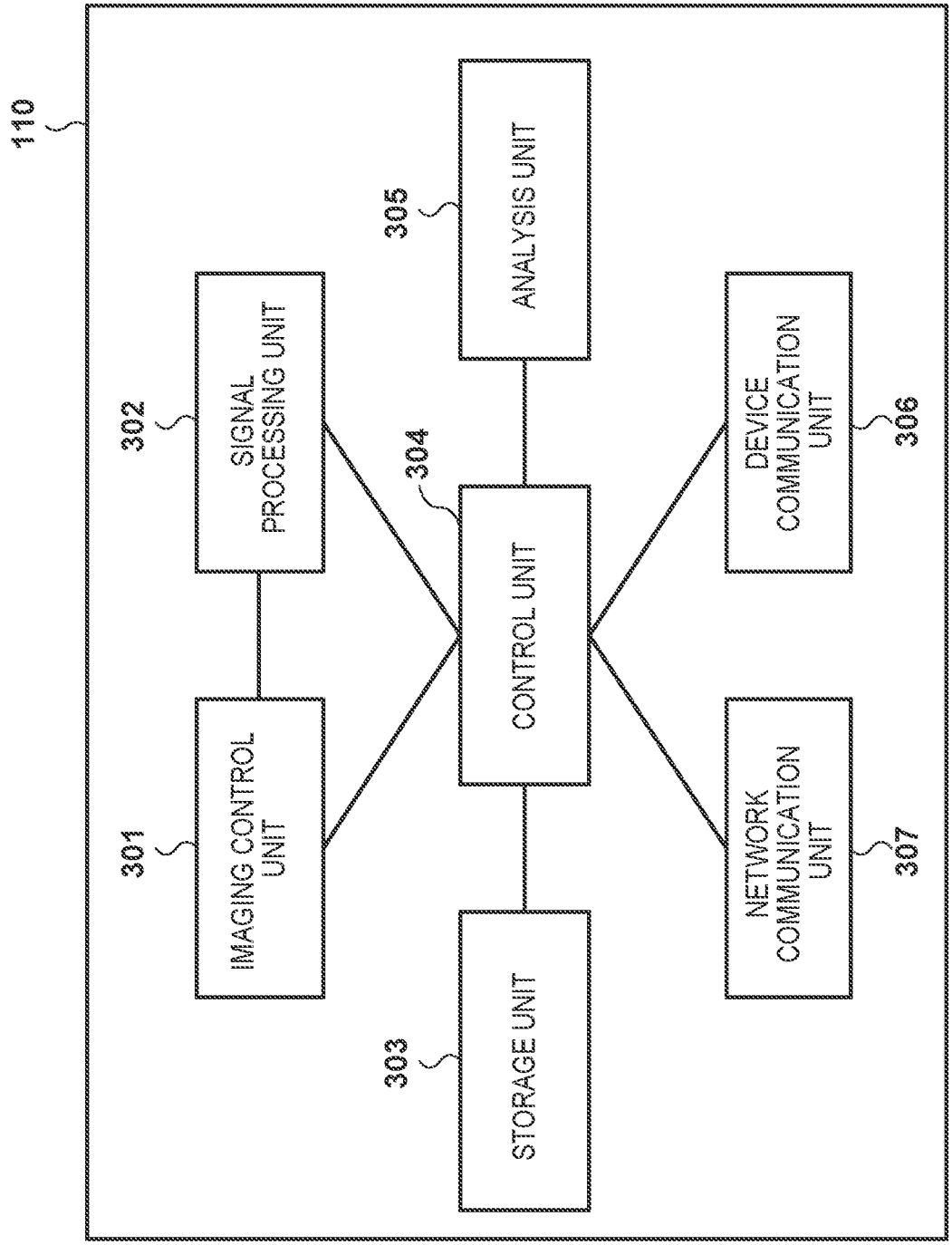
FIG. 3 is a block diagram showing an example of the functional arrangement of the imaging apparatus.

FIG. 3 shows an example of the functional arrangement of the imaging apparatus 110. The imaging apparatus 110 includes, as its functions, for example, an imaging control unit 301, a signal processing unit 302, a storage unit 303, a control unit 304, an analysis unit 305, a device communication unit 306, and a network communication unit 307.

The imaging control unit 301 executes control of capturing the peripheral environment via the imaging unit 201. The signal processing unit 302 performs predetermined processing for the image captured by the imaging control unit 301, thereby generating data of the captured image. The data of the captured image will simply be referred to as the "captured image" hereinafter. The signal processing unit 302, for example, encodes the image captured by the imaging control unit 301. The signal processing unit 302 performs encoding for a still image using, for example, an encoding method such as JPEG (Joint Photographic Experts Group). The signal processing unit 302 performs encoding for a moving image using an encoding method such as H.264/MPEG-4 AVC (to be referred to as "H.264" hereinafter) or HEVC (High Efficiency Video Coding). The signal processing unit 302 may encode an image using an encoding method selected by the user from a plurality of encoding methods set in advance via, for example, an operation unit (not shown) of the imaging apparatus 110.

The storage unit 303 stores a result of analysis processing to be described later Note that in this embodiment, processing to be executed is analysis processing. However, arbitrary processing may be executed. The control unit 304 controls the signal processing unit 302, the storage unit 303, the analysis unit 305, the device communication unit 306, and the network communication unit 307 such that each unit executes predetermined processing.

The analysis unit 305 selectively executes at least one of pre-analysis processing, analysis processing, and post-analysis processing for a captured image. Pre-analysis processing is processing to be executed for a captured image before analysis processing to be described later is executed. In the pre-analysis processing according to this embodiment, as an example, processing of dividing a captured image to create divided images is executed. Analysis processing is processing of outputting information obtained by analyzing an input image. In the analysis processing according to this embodiment, as an example, processing of receiving a divided image obtained by pre-analysis processing, executing at least one of human body detection processing, face detection processing, and vehicle detection processing, and outputting the analysis processing result is executed. The analysis processing is, for example, processing configured to output the position of an object in a divided image using a machine-learning model that has learned to detect an object included in an image. Post-analysis processing is processing to be executed after analysis processing is executed. In the post-analysis processing according to this embodiment, as an example, processing of outputting, as a processing result, a value obtained by adding the numbers of objects detected in the divided images based on the analysis processing result for each divided image is executed. Note that the analysis processing may be processing of detecting an object in an image by performing pattern matching and outputting the position of the object.

The device communication unit 306 performs communication with the detachable device 100. The device communication unit 306 converts input data into a format processible by the detachable device 100, and transmits data obtained by the conversion to the detachable device 100. In addition, the device communication unit 306 receives data from the detachable device 100, and converts the received data into a format processible by the imaging apparatus 110. In this embodiment, as the conversion processing, the device communication unit 306 executes processing of converting a decimal between a floating point format and a fixed point format. However, the present invention is not limited to this, and another processing may be executed by the device communication unit 306. Additionally, in this embodiment, the device communication unit 306 is assumed to transmit a command sequence determined in advance within the range of the SD standard to the detachable device 100 and receive a response from the detachable device 100, thereby performing communication with the detachable device 100. The network communication unit 307 performs communication with the input-output device 130 via the network 120.

(Arrangement of Detachable Device)

Figure 4:
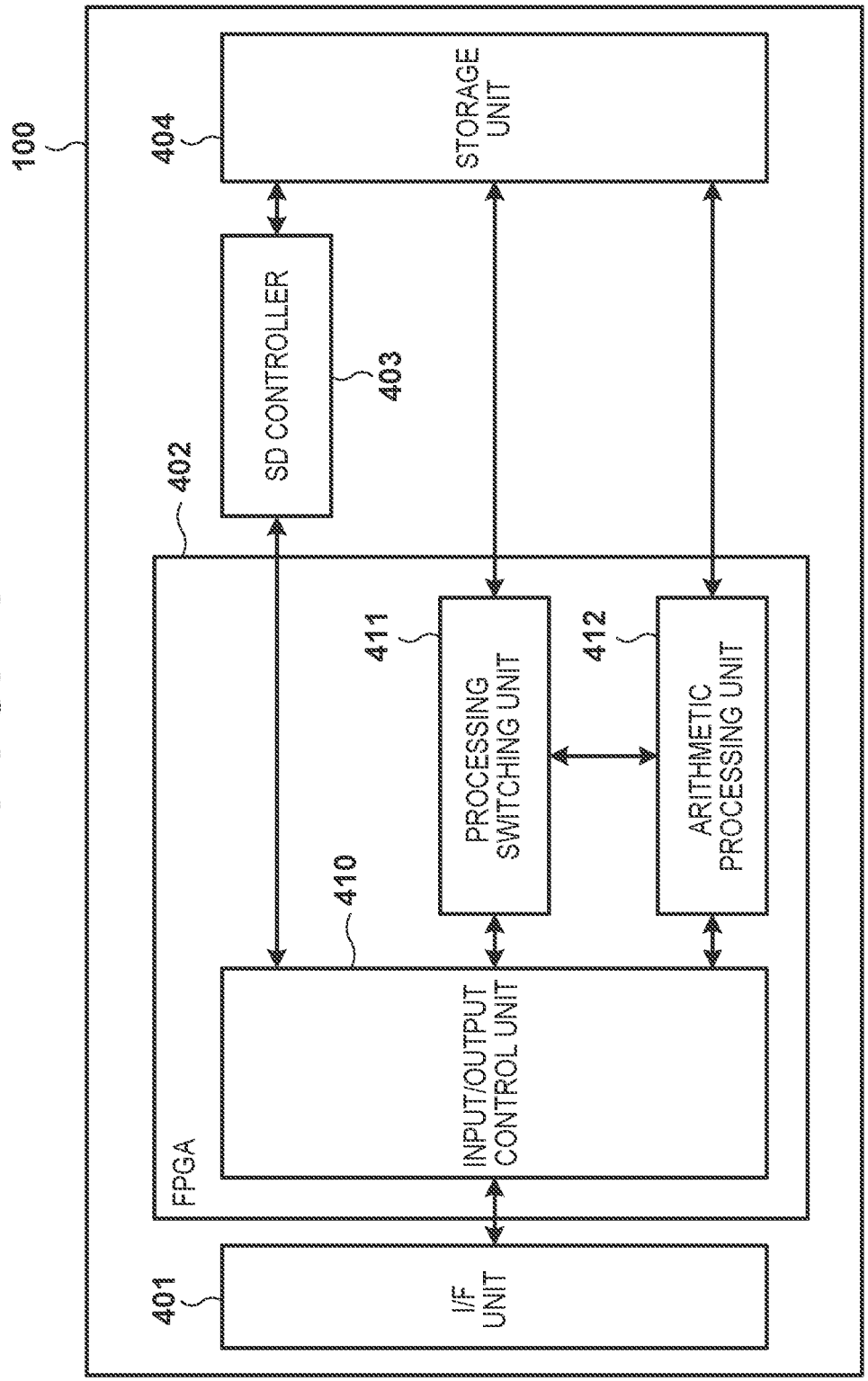
FIG. 4 is a block diagram showing an example of the hardware arrangement of a detachable device.

FIG. 4 is a block diagram showing an example of the hardware arrangement of the detachable device 100. As an example, the detachable device 100 is configured to include an I/F unit 401, an FPGA 402, an SD controller 403, and a storage unit 404. The detachable device 100 is formed into a shape that can be inserted/removed into/from the attaching/detaching socket of the SD I/F unit 205 provided in the imaging apparatus 110, that is, a shape complying with the SD standard.

The I/F unit 401 is an interface portion used to connect an apparatus such as the imaging apparatus 110 and the detachable device 100. The I/F unit 401 is configured to include, for example, an electrical contact terminal that receives supply of power from the imaging apparatus 110 and generates and distributes a power supply to be used in the detachable device 100, and the like. Concerning items defined in (complying with) the SD standard, the I/F unit 401 complies with that, like the SD I/F unit 205 of the imaging apparatus 110. Reception of images and setting data from the imaging apparatus 110 and transmission of data from the FPGA 402 to the imaging apparatus 110 are executed via the I/F unit 401.

The FPGA 402 is configured to include an input/output control unit 410, a processing switching unit 411, and an arithmetic processing unit 412. The FPGA 402 is a kind of semiconductor device capable of repetitively reconstructing an internal logic circuit structure. By processing implemented by the FPGA 402, a processing function can be added (provided) to the apparatus to which the detachable device 100 is attached. Additionally, the logic circuit structure can be changed later by the reconstruction function of the FPGA 402. For this reason, when the detachable device 100 is attached to, for example, an apparatus in a field of a quickly advancing technology, appropriate processing can be executed in the apparatus at an appropriate timing. Note that in this embodiment, an example in which an FPGA is used will be described. However, for example, a general-purpose ASIC or a dedicated LSI may be used if processing to be described later can be implemented. The FPGA 402 is activated by writing, from a dedicated I/F, setting data including the information of a logic circuit structure to be generated or reading out the setting data from the dedicated I/F. In this embodiment, the setting data is held in the storage unit 404. When powered on, the FPGA 402 reads out the setting data from the storage unit 404 and generates and activates a logic circuit. However, the present invention is not limited to this. For example, a dedicated circuit may be implemented in the detachable device, and the imaging apparatus 110 may write setting data in the FPGA 402 via the I/F unit 401.

The input/output control unit 410 is configured to include a circuit used to transmit/receive an image to/from the imaging apparatus 110, a circuit that analyzes a command received from the imaging apparatus 110, a circuit that controls based on a result of analysis, and the like. Commands here are defined by the SD standard, and the input/output control unit 410 can detect some of these. Details of the functions will be described later. The input/output control unit 410 controls to transmit an image to the SD controller 403 in storage processing and transmit an image to the arithmetic processing unit 412 in image analysis processing. If the setting data of switching of processing is received, the input/output control unit 410 transmits the setting data to the processing switching unit 411. The processing switching unit 411 is configured to include a circuit configured to obtain the information of the image analysis processing function from the storage unit 404 based on the setting data received from the imaging apparatus 110 and write the information in the arithmetic processing unit 412. The information of the image analysis processing function includes, for example, setting parameters representing the order and types of operations to be processed in the arithmetic processing unit 412, the coefficients of operations, and the like.

The arithmetic processing unit 412 is configured to include a plurality of arithmetic circuits needed to execute the image analysis processing function. The arithmetic processing unit 412 executes each arithmetic processing based on the information of the image analysis processing function received from the processing switching unit 411, transmits the processing result to the imaging apparatus 110, and/or records the processing result in the storage unit 404. As described above, the FPGA 402 extracts the setting data of a processing function of an execution target, which is included in the setting data corresponding to a plurality of processing functions held in advance, and rewrites the processing contents to be executed by the arithmetic processing unit 412 based on the extracted setting data. This allows the detachable device 100 to selectively execute at least some of the plurality of processing functions. In addition, when the setting data of newly added processing is added at any time, latest processing can be executed on the side of the imaging apparatus 110. Note that holding a plurality of setting data corresponding to a plurality of processing functions will be expressed as holding a plurality of processing functions hereinafter. That is, even in a state in which the FPGA 402 of the detachable device 100 is configured to execute one processing function, if the processing contents of the arithmetic processing unit 412 can be changed by setting data for another processing function, this is expressed as holding a plurality of processing functions.

The SD controller 403 is a known control IC (Integrated Circuit) as defined by the SD standard, and executes control of a slave operation of an SD protocol and control of data read/write for the storage unit 404. The storage unit 404 is formed by, for example, a NAND flash memory, and stores various kinds of information such as storage data written from the imaging apparatus 110, the information of the image analysis processing function written in the arithmetic processing unit 412, and setting data of the FPGA 402. Note that the write and read of data to and from the storage unit 404 are performed on a block (having a size of, for example, 512 bytes) basis.

Figure 5:
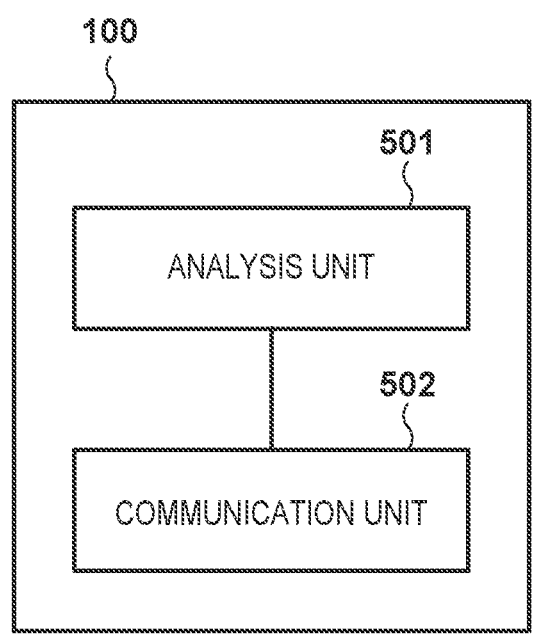
FIG. 5 is a block diagram showing an example of the functional arrangement of the detachable device.

FIG. 5 shows an example of the functional arrangement of the detachable device 100. The detachable device 100 includes, as its functional arrangement, for example, an analysis unit 501 and a communication unit 502. The analysis unit 501 executes analysis processing for, for example, an image or audio data. For example, if an analysis processing setting request is input, the analysis unit 501 executes setting to set the input analysis processing in an executable state. If an image is input, the analysis unit 501 executes the analysis processing set in the executable state for the input image. In this embodiment, executable analysis processing includes human body detection processing and face detection processing but is not limited to these. For example, it may be processing (face authentication processing) of determining whether a person stored in advance is included in an image. For example, if the degree of matching between the image characteristic amount of a person stored in advance and the image characteristic amount of a person detected from an input image is calculated, and the degree of matching is equal to or larger than a threshold, it is determined that the person is the person stored in advance. Alternatively, it may be processing of superimposing a predetermined mask image or performing mosaic processing on a person detected from an input image for the purpose of privacy protection. It may be processing of detecting, using a learning model that has learned a specific action of a person by machine learning, whether a person in an image is taking the specific action. Furthermore, it may be processing of determining what kind of region a region in an image is. It may be processing of determining, using, for example, a learning model that has learned buildings, roads, persons, sky and the like by machine learning, what kind of region a region in an image is. As described above, executable analysis processing can be applied to both image analysis processing using machine learning and image analysis processing without using machine learning. Each analysis processing described above may be executed not independently by the detachable device 100 but in cooperation with the imaging apparatus 110. The communication unit 502 performs communication with the imaging apparatus 110 via the I/F unit 401.

The input-output device 130 is formed as a computer such as a general PC, and can execute various kinds of functions by executing, by a processor, programs stored in memories and a storage device.

<Procedure of Processing>

An example of the procedure of processing executed in the system will be described next. Note that processing executed by the imaging apparatus 110 in the following processes is implemented by, for example, by a processor in the arithmetic processing unit 203, executing a program stored in a memory or the like. However, this is merely an example, and processing to be described later may partially or wholly be implemented by dedicated hardware. In addition, processing executed by the detachable device 100 or the input-output device 130 may also be implemented by, by a processor in each apparatus, executing a program stored in a memory or the like, and processing may partially or wholly be implemented by dedicated hardware.

(Overall Procedure)

Figure 6:
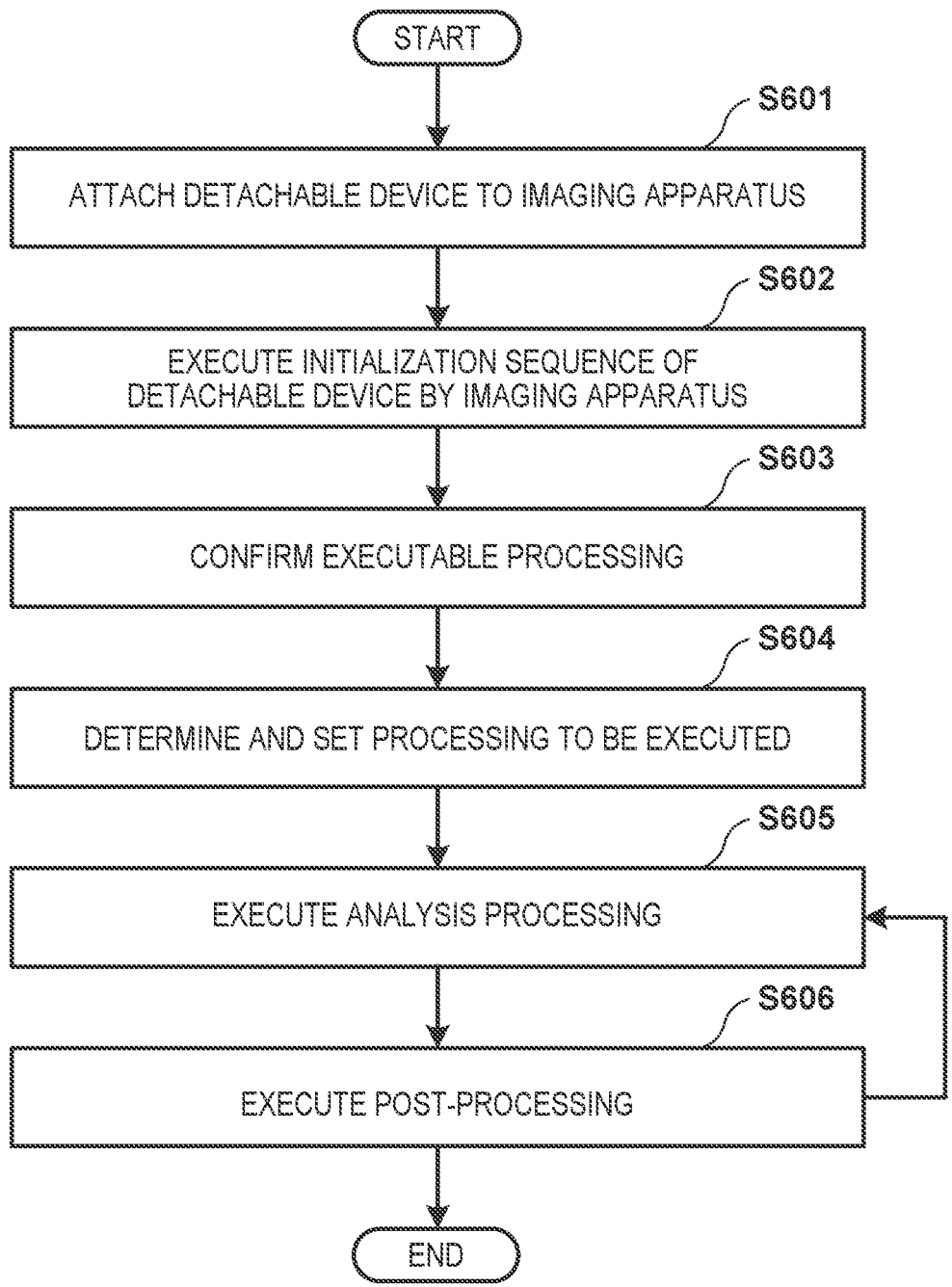
FIG. 6 is a flowchart showing an example of processing executed by the system.

FIG. 6 schematically shows a series of procedures of image analysis processing executed by the system. In this processing, first, the user attaches the detachable device 100 to the imaging apparatus 110 (step S601). The imaging apparatus 110 executes an initialization sequence of the detachable device 100 (step S602). In this initialization sequence, predetermined commands are transmitted/received between the imaging apparatus 110 and the detachable device 100, and a state in which the imaging apparatus 110 can use the detachable device 100 is set. After that, the imaging apparatus 110 confirms processing executable by the detachable device 100, and confirms processing that can be executed locally (that can be executed only by the imaging apparatus 110 or by the combination of the imaging apparatus 110 and the detachable device 100) (step S603). Note that although the detachable device 100 can be configured to execute arbitrary processing, processing irrelevant to processing that should be executed on the side of the imaging apparatus 110 need not be taken into consideration. In an example, the imaging apparatus 110 may hold a list of executable processes that is obtained from, for example, the input-output device 130 in advance. In this case, upon obtaining, from the detachable device 100, information representing processing executable by the detachable device 100, the imaging apparatus 110 can confirm only executable processing depending on whether the processing is included in the list.

Next, the imaging apparatus 110 determines processing to be executed, and executes setting of the detachable device 100 as needed (step S604). That is, if at least a part of processing determined as an execution target is to be executed by the detachable device 100, setting of the detachable device 100 for the processing is executed. In this setting, for example, reconstruction of the FPGA 402 using setting data corresponding to the execution target processing can be performed. Then, the imaging apparatus 110 or the detachable device 100 executes analysis processing (step S605). After that, the imaging apparatus 110 executes post-processing (step S606). Note that the processes of steps S605 and S606 are repetitively executed. The processing shown in FIG. 6 is executed when, for example, the detachable device 100 is attached. However, at least a part of the processing shown in FIG. 6 may repetitively be executed such that, for example, the process of step S603 is executed again when the detachable device 100 is detached.

Steps S603 to S606 will further be described. In step S603, the control unit 304 of the imaging apparatus 110 reads out a first processing list that is a list of processes executable by the analysis unit 305 of the imaging apparatus 110 itself and is stored in the storage unit 303. Next, the control unit 304 controls the device communication unit 306 to issue a read request (read command) to a specific address of the attached detachable device 100. The specific address will sometimes be referred to as an "address A" hereinafter. Note that details of the data stored at the address A will be described later. The control unit 304 generates a list of processing functions (second processing list) held by the detachable device 100 based on the data read out from the address A.

The input-output device 130 obtains the first processing list and the second processing list from the imaging apparatus 110 via the network, and presents these to the user by screen display or the like. The user selects analysis processing to be executed (to be referred to as "execution target processing" hereinafter) from the displayed list via an operation unit. The input-output device 130 notifies the imaging apparatus 110 of the execution target processing selection result.

In step S604, if the execution target processing is included in the second processing list, the control unit 304 controls the device communication unit 306 to transmit an execution target processing setting request to the detachable device 100. The communication unit 502 of the detachable device 100 receives the execution target processing setting request from the imaging apparatus 110. The communication unit 502 outputs the execution target processing setting request received from the imaging apparatus 110 to the analysis unit 501. Based on the execution target processing setting request input from the communication unit 502, the analysis unit 501 executes setting to set a state in which the detachable device 100 can execute the execution target processing. For example, the processing switching unit 411 switches the execution target processing of the arithmetic processing unit 412 in accordance with the setting request. For example, after the setting processing is completed, the communication unit 502 transmits a setting completion notification to the imaging apparatus 110.

In step S605, if the execution target processing is included in the second processing list, the control unit 304 controls the device communication unit 306 to transmit an analysis processing target image to the detachable device 100. For example, the control unit 304 issues an analysis processing target image write request (write command), thereby transmitting the analysis processing target image to the detachable device 100. The communication unit 502 of the detachable device 100 receives the analysis processing target image from the imaging apparatus 110, and outputs the image received from the imaging apparatus 110 to the analysis unit 501. The analysis unit 501 executes the execution target processing set in step S604 for the image input from the communication unit 502, and stores the image in the storage unit 404.

After that, in step S606, in response to an analysis processing result read request (read command) from the imaging apparatus 110, the communication unit 502 reads out the analysis processing result obtained by the processing of the analysis unit 501 from the storage unit 404 and transmits the analysis processing result to the imaging apparatus 110. The control unit 304 of the imaging apparatus 110 controls the device communication unit 306 to receive the analysis processing result from the detachable device 100. After that, the control unit 304 controls the analysis unit 305 to execute post-analysis processing for the analysis processing result.

(Communication Between Imaging Apparatus 110 and Detachable Device 100)

Interface Configuration of Detachable Device

Communication between the imaging apparatus 110 and the detachable device 100 will be described here. The arithmetic processing unit 203 of the imaging apparatus 110 and the SD controller 403 of the detachable device 100 are connected by a power supply line, a GND line, a clock line, a command line, and a data line via the device insertion socket of the SD I/F unit 205 of the imaging apparatus 110. Note that the clock line, the command line, and the data line are connected via the FPGA 402. On the clock line, a synchronization clock output from the arithmetic processing unit 203 is communicated. On the command line, a command issued for an operation request from the arithmetic processing unit 203 to the SD controller 403 and a response to the command from the SD controller 403 to the arithmetic processing unit 203 are communicated. On the data line, write data from the arithmetic processing unit 203 and read data from the detachable device 100 are communicated. In addition, the arithmetic processing unit 203 discriminates High and Low of a device detect signal of the device insertion socket of the SD I/F unit 205, thereby recognizing whether the detachable device 100 is inserted.

Initialization of Detachable Device

The arithmetic processing unit 203 issues a command to the SD controller 403 on the command line after power supply. Upon receiving a response from the SD controller 403 and output data representing device information as an SD card, the arithmetic processing unit 203 sets a voltage for data communication, a communication speed (clock frequency), and the like.

Structures of Command and Response

FIGS. 7A and 7B shows examples of the structures of a command and a response communicated on the command line. The command and response have structures complying with the SD standard. A command 701 (FIG. 7A) issued from the arithmetic processing unit 203 to the SD controller 403 is configured to include a command number portion 704, a command argument portion 705, and an error correction data portion 706. In the command number portion 704, a value indicating the type of the command is described. For example, if a value "23" is stored in the command number portion 704, this indicates that the command is a block count designation command for designating the number of data blocks. If a value "25" is stored in the command number portion 704, this indicates that the command is a multi-write command. If a value "12" is stored in the command number portion 704, this indicates that the command is a data transfer stop command. In the command argument portion 705, pieces of information such as the number of transfer data blocks and the write/read address of a memory are designated in accordance with the type of the command. A command start bit 702 representing the start position of the command is added to the first bit of the command, and a command end bit 707 representing the end of the command is added to the final bit of the command. Additionally, a direction bit 703 representing that the command is a signal output from the imaging apparatus 110 to the detachable device 100 is also added after the command start bit 702.

A response 711 (FIG. 7B) returned from the SD controller 403 in response to the command from the arithmetic processing unit 203 includes a response number portion 714 representing for which command the response is returned, a response argument portion 715, and an error correction data portion 716. A response start bit 712 representing the start position of the response is added to the first bit of the response, and a response end bit 717 representing the end position of the response is added to the final bit of the response. Additionally, a direction bit 713 representing that the response is a signal output from the detachable device 100 to the imaging apparatus 110 is also added after the response start bit 712. In the response argument portion 715, pieces of information such as the status of the SD card are stored in accordance with the command type. In the response number portion 714, a value indicating the type of the command is described.

Transfer of Data

A method of data transmission/reception between the arithmetic processing unit 203 and the detachable device 100 will be described next. As described above, the SD I/F unit 205 transfers data on a block basis in both data write and read. The block is, for example, a unit of data write and read in the storage unit 404 and has a size of, for example, 512 bytes.

The following three methods are usable by the arithmetic processing unit 203 to transfer data of a plurality of blocks to the detachable device 100. The first method is a method using a write command (to be referred to as a single write command hereinafter) for transmitting only data of one block. The single write command is a command of the arithmetic processing unit 203 to transfer and write data of one block without issuing a block designation command and a transfer stop command. The address of the storage unit 404 to be accessed is set in the command argument portion 705.

The remaining two methods are methods using a multi-write command that instructs transfer and write of data of a plurality of blocks by one command. In the first method, after the number of blocks is designated by the block count designation command of transfer data, data as many the designated number of blocks are transferred by a multi-write command. In the block count designation command, the number of blocks of write data is designated in the command argument portion 705. In the multi-write command, the address of the storage unit 404 at which the data should be written is designated in the command argument portion 705. In the second method, a multi-write command is issued without issuing a block count designation command, thereby starting data transfer. A transfer stop command is issued at the end of data transfer, thereby ending the processing. At this time, only the address of the storage unit 404 at which the data should be written is designated in the command argument portion 705 of the multi-write command. Note that in both the write processes by the multi-write command, the SD controller 403 starts the write from the address designated by the command. Every time data of one block is input, the SD controller 403 increments the write address and performs the data write to the storage unit 404. The arithmetic processing unit 203 can arbitrarily switch the three write methods.

Note that when performing storage processing, the FPGA 402 directly inputs the command and data sent from the arithmetic processing unit 203 to the SD controller 403, and the SD controller 403 stores the received data at the address of the storage unit 404 designated by the command. When performing image analysis processing, the FPGA 402 executes analysis processing for the data sent from the arithmetic processing unit 203, and outputs the data of the processing result and information for designating a predetermined address of the storage unit 404 to the SD controller 403. The SD controller 403 stores the processing result at the designated address of the storage unit.

The following three methods are usable by the arithmetic processing unit 203 to read out data of a plurality of blocks from detachable device 100. The first method is a method using a read command (to be referred to as a single read command hereinafter) for reading out and receiving only data of one block. The single read command is a command of the arithmetic processing unit 203 to read out data of one block without issuing a block designation command and a transfer stop command. The address of the storage unit 404 to be accessed is set in the command argument portion 705.

The remaining two methods are methods for instructing read of data of a plurality of blocks by one command. In the first method, after the number of blocks is designated by the block count designation command, a multi-read command is issued, thereby reading out data of the designated number of blocks. In the block count designation command, the number of blocks of read data is designated in the command argument portion 705. In the command argument portion 705 of the multi-read command, the address of the memory of the data read source is designated. In the second method, a multi-read command is issued without issuing a block count designation command, thereby starting data read. When a transfer stop command is issued, the processing is ended. Note that in both the read processes by the multi-read command, the SD controller 403 starts the read from the address designated by the command. Every time data of one block is output, the SD controller 403 increments the read address and reads out data stored in the storage unit 404. The arithmetic processing unit 203 can arbitrarily switch the three read methods.

Note that if write data or read data is one block, a single write command or a single read command is issued, thereby executing data write or read without issuing a block count designation command or a transfer stop command. In the single write command and the single read command as well, the address of the storage unit 404 to be accessed is designated in the command argument portion 705, as described above.

The arithmetic processing unit 203 performs the write in the detachable device 100, thereby transmitting data as the target of storage processing or image analysis processing to the detachable device 100. In addition, the arithmetic processing unit 203 performs the read from the detachable device 100, thereby obtaining image data stored in the storage unit 404, a processing result of image analysis processing, and the information of image analysis processing functions held by the detachable device 100.

Information Confirmation of Image Analysis Processing Function

Figure 12:
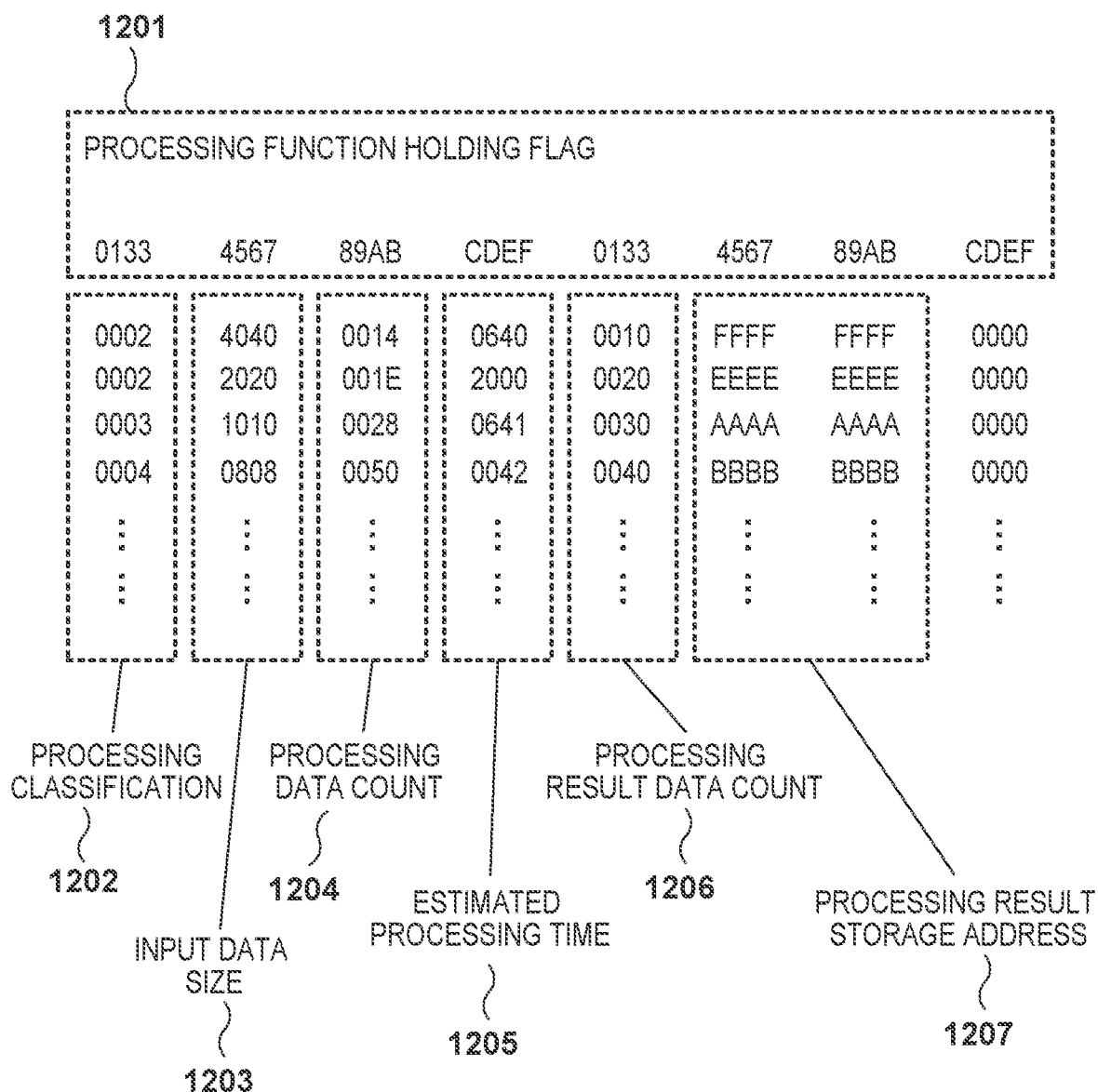
FIG. 12 is a view schematically showing data in an address storing the information of a processing function.

The detachable device 100 according to this embodiment stores the information of a processing function held by the self-device at the specific address A of the storage unit 404. The arithmetic processing unit 203 of the imaging apparatus 110 issues a multi-write command or a multi-read command to the address A, thereby confirming the information of the processing function held by the detachable device 100. The information of the processing function here includes whether the processing function is held, a time needed until the completion of processing if it is executed, the data size of a processing result, and the information of an address for storing the processing result. FIG. 12 shows an example of the information of processing functions. A processing function holding flag 1201 represents that the detachable device 100 has an image analysis processing function. The imaging apparatus 110 confirms the processing function holding flag 1201, thereby determining whether the detachable device 100 has an image analysis processing function. A processing function classification 1202 represents analysis processing held by the detachable device 100. An input data size 1203 and a processing data count 1204 represent information concerning the data input specifications of each processing function. An estimated processing time 1205 represents a time needed until processing result output, and a processing result data count 1206 represents the number of data of a processing result. A processing result storage address 1207 represents where a processing result is stored in the storage unit 404. The arithmetic processing unit 203 reads out data of the address A of the storage unit 404 as shown in FIG. 12, thereby obtaining a processing function table as shown in FIG. 13. Note that in this specification, the number of data is the number of blocks corresponding to a data amount (data size).

If the read command to the address A is not issued from the arithmetic processing unit 203, the detachable device 100 judges that the device to which the self-device is attached is a device that does not use the image analysis processing function. In this case, concerning the data to be transferred, the detachable device 100 can execute only storage processing for the storage unit 404. This allows the detachable device 100 to function only as a memory device for a device that does not need the image analysis processing function. The method of storing the information of the processing function at the specific address A of the storage unit 404 has been described here. However, the method is not limited to this. For example, the information of the processing function may be added to the response argument portion 715 in the response to the command used at the time of initialization of the detachable device 100.

Note that the imaging apparatus 110 executes the read of the address A of the storage unit 404, for example, after the end of initialization of the detachable device 100. Also, the imaging apparatus 110 discards the read information if device detection is not performed in the socket any more. If a device is inserted into the socket after the discard of the information, the imaging apparatus 110 reads out the value of the address A again after the end of the initialization. Hence, if a different detachable device is inserted, the imaging apparatus 110 can read out the information of a function held by the detachable device and perform setting.

<Image Data Generation Method>

Figure 8:
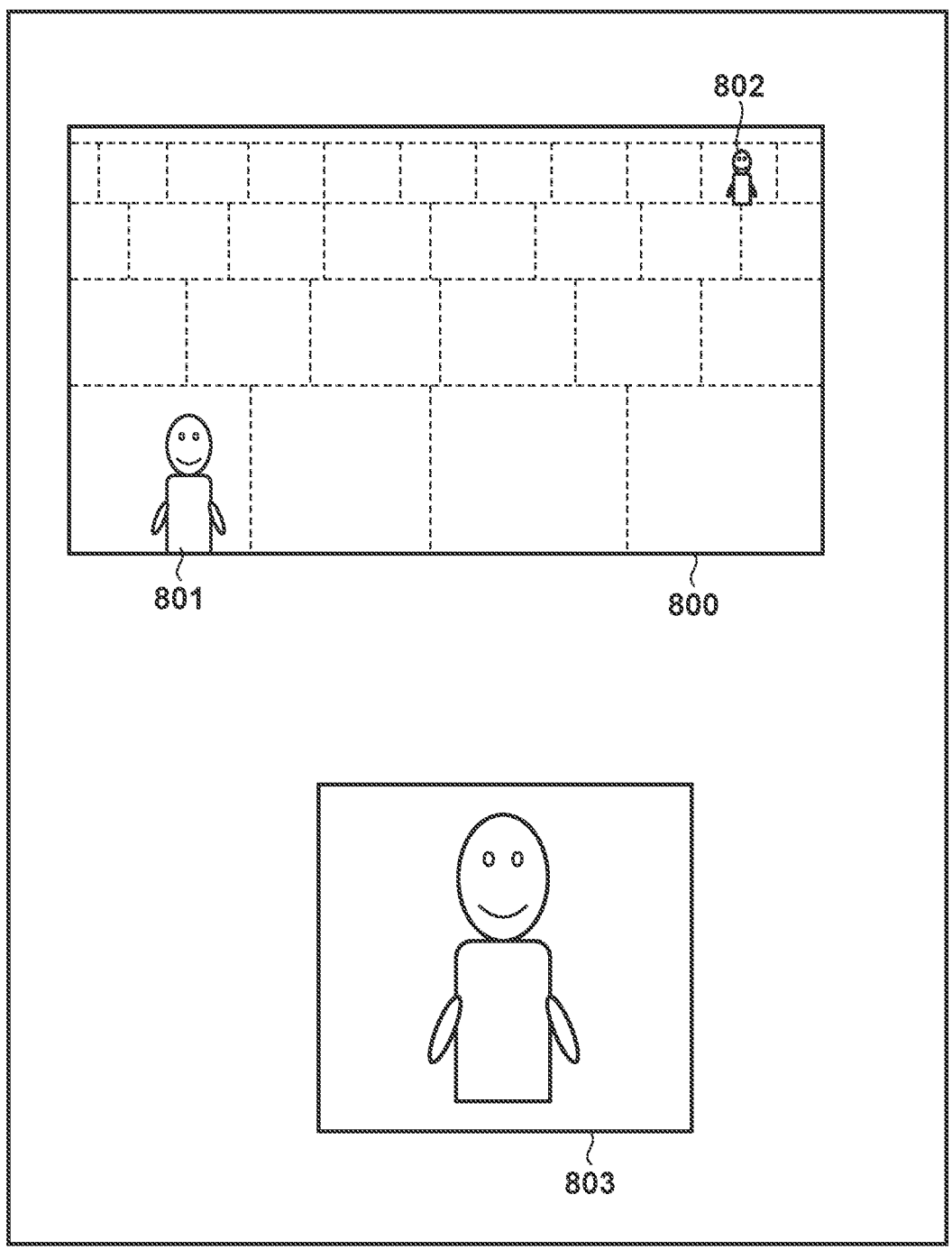
FIG. 8 is a view showing an example of generation of divided image data according to the first embodiment.

A method of the imaging apparatus 110 according to this embodiment to generate image data by dividing an image will be described with reference to FIG. 8 using an example of a face recognition system. Hence, in the following example, the arithmetic processing unit 412 of the detachable device 100 performs inference arithmetic processing for performing face recognition from an input image.

An image 800 is an image that the arithmetic processing unit 203 receives from the image processing unit 202. A learning image 803 is an image used to learn inference arithmetic processing to be performed by the arithmetic processing unit 412. The learning image 803 has a predetermined image size, and is adjusted such that a face occupies a predetermined ratio in the image. Hence, image data that is close to the image size of the learning image 803 and the ratio of the size of a face in the image as much as possible is preferably input to the inference arithmetic processing to be performed by the arithmetic processing unit 412.

Hence, if an object 801 and an object 802 are captured as in the image 800 due to the difference in the object distance, the arithmetic processing unit 203 divides the image in accordance with the positions of the object 801 and the object 802 on the image so as to obtain a ratio close to the ratio of the learning image 803. Broken lines on the image 800 shown in FIG. 8 indicate an example of division of the image 800. Additionally, the arithmetic processing unit 203 performs expansion/contraction processing such that the image size matches the image size of the learning image 803, thereby generating a plurality of divided image data to be transmitted to the detachable device 100. As a result, all the plurality of divided image data have the same size. Note that the image size of the learning image 803 is the input size of the processing function of the detachable device 100. The arithmetic processing unit 203 can obtain the image size by reading out the above-described specific address A. In addition, the ratio of the size of the face in the image may be obtained from the specific address A or held in the arithmetic processing unit 203 in advance. Note that the arithmetic processing unit 203 judges and sets the division positions from the image 800. However, the division positions may directly be set by the user from the input-output device 130.

<Image Data Transmission Processing>

Figure 9:
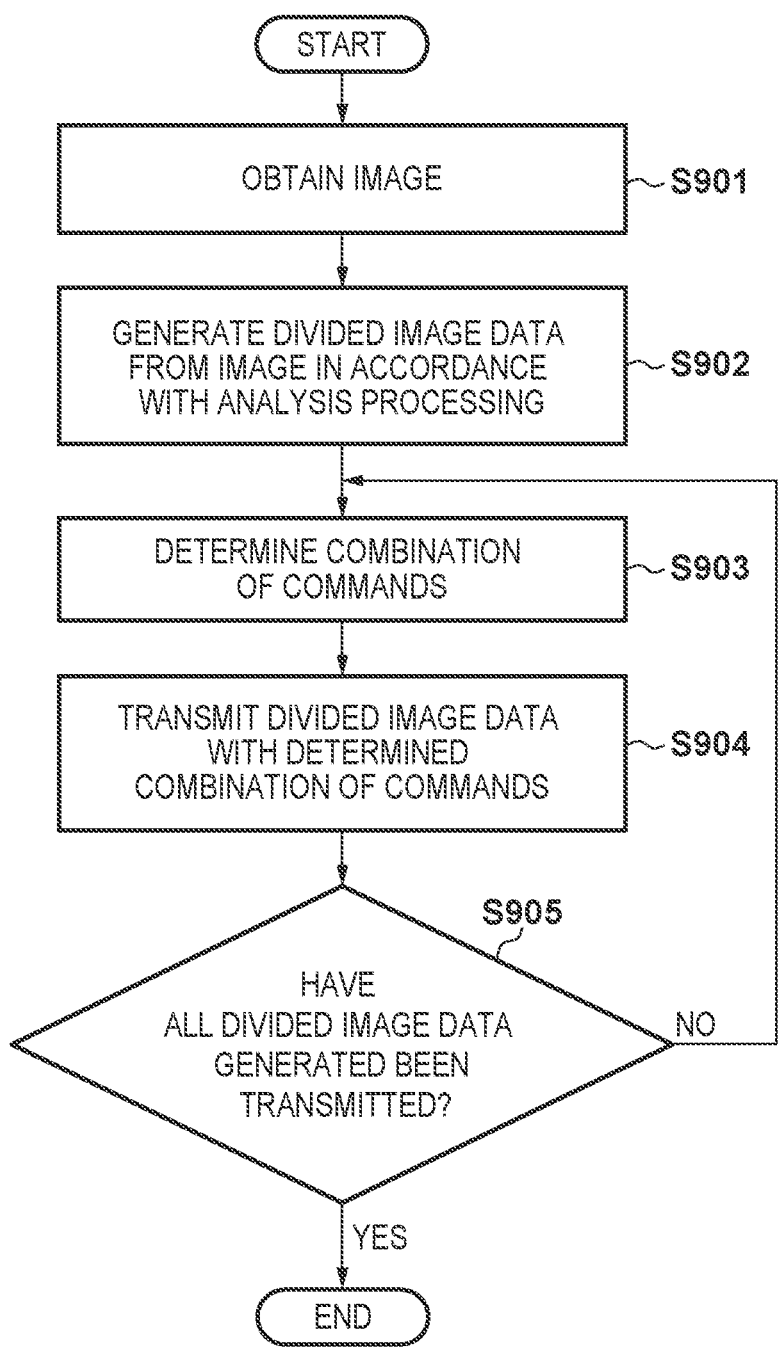
FIG. 9 is a flowchart showing image transmission processing according to the first embodiment.

Processing of the imaging apparatus (arithmetic processing unit 203) to divisionally transmit an image captured by the imaging unit 201 will be described with reference to FIG. 9. Note that the processing shown in FIG. 9 is processing performed by the arithmetic processing unit 203 during steps S604 and S605 of FIG. 6.

When the imaging unit 201 of the imaging apparatus 110 obtains an image, the image processing unit 202 performs image processing for the obtained image. In step S901, the arithmetic processing unit 203 obtains the image that has undergone the image processing by the image processing unit 202. In step S902, the arithmetic processing unit 203 generates a plurality of divided image data by the method described above with reference to FIG. 8 in accordance with analysis processing set in step S204.

In step S903, the arithmetic processing unit 203 determines, for one divided image data, the combination of commands used to transmit the divided image data. The determined combination of commands will be referred to as a command group hereinafter. A time needed for inference arithmetic processing executed on the detachable device 100 becomes long in proportion to the size of input image data or the operating frequency of the arithmetic processing unit 412, that is, the speed of communication with the detachable device 100. On the other hand, the time assigned as the calculation time of the arithmetic processing unit 412 has an upper limit in accordance with the processing speed necessary in the entire image analysis processing. Hence, a combination of commands is selected within the range to satisfy the upper limit time, and a command group used to transmit divided image data is determined. For example, based on the data amount of divided image data and the time required for communication of commands, the combination of commands that form the command group is determined such that transmission of divided image data is ended within the required time. However, when the data transfer method changes, a single write command or a multi-write command needs to be issued. Hence, the time necessary for transmission of such a command also needs to be taken into consideration. For example, as for the single write command, since communication of a command occurs in each block, transmission takes time. Hence, data transmission using a multi-write command and a data transfer stop command is faster as compared to a single write command.

In step S904, the arithmetic processing unit 203 executes transmission of divided image data to the detachable device 100 a plurality of times using a write command or multi-write command in accordance with the command group (the combination of commands) determined in step S903. In step S905, the arithmetic processing unit 203 determines whether all the plurality of divided image data generated from the obtained image have been transmitted. Upon determining that all the divided image data have been transmitted, this processing is ended. If divided image data that has not been transmitted yet exists, the arithmetic processing unit 203 selects next divided image data and returns the process to step S903. The arithmetic processing unit 203 stores the combination of commands used for the transmission, and selects or determines a combination of commands in next step S903 such that it does not match the stored combination of commands. In this way, the combination of commands that form the command group used for transmission is changed during transmission of the plurality of divided image data.

Note that a plurality of command groups (a plurality of types of combinations of commands) that satisfy the above-described upper limit time may be registered as a list and sequentially selected. Note that after all the combinations registered in the list are selected, the selection order may be changed. Also, as described with reference to FIG. 8, since the sizes of the divided image data are made equal to a predetermined size, the arithmetic processing unit 412 of the detachable device 100 can confirm that one divided image data is transmitted when the size of the transmitted data reaches the predetermined size. Note that a predetermined code representing the start and/or end of divided image data may be transmitted for each divided image data, and the arithmetic processing unit 412 may confirm the transmission of the divided image data by detecting the predetermined code. In this case, the plurality of divided image data may have different sizes.

<Calculation Result Reception Processing>

Processing in a case in which the imaging apparatus 110 receives a calculation result from the detachable device 100 will be described next. The arithmetic processing unit 203 receives the calculation result of the FPGA 402 (arithmetic processing unit 412) from the detachable device 100 using a single read command or a multi-read command. The single read command and the multi-read command are as described above.

Figure 10:
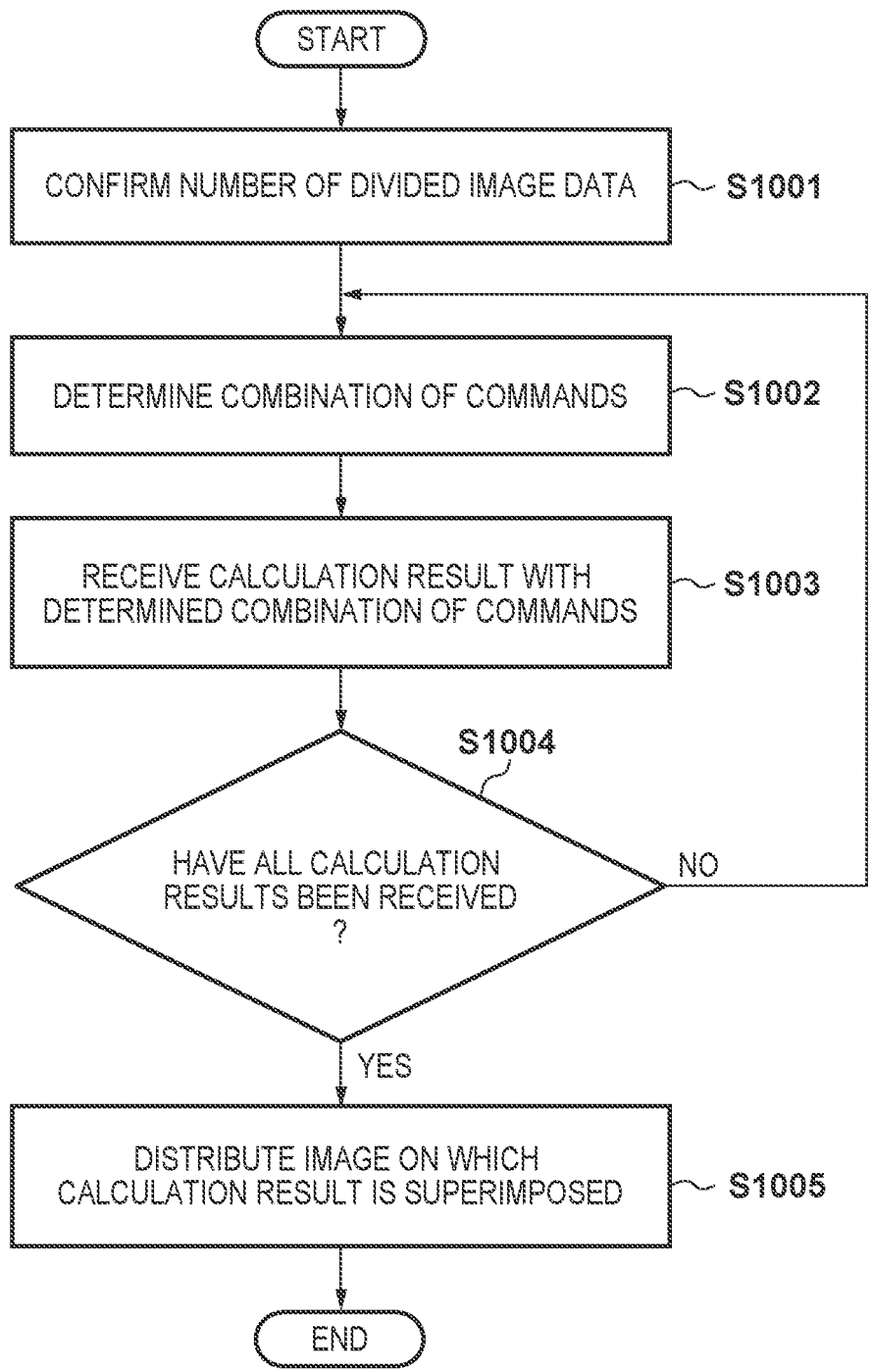
FIG. 10 is a flowchart showing calculation result reception processing according to the first embodiment.

FIG. 10 is a flowchart showing processing of the arithmetic processing unit 203 to receive a calculation result that has undergone inference processing of the detachable device 100. At the start of processing shown in the flowchart of FIG. 10, the processing described above with reference to FIG. 9 ends, inference processing by the arithmetic processing unit 412 is performed for all divided image data in the detachable device 100, and the calculation result is stored in the storage unit 404. Note that the calculation result of divided image data is stored in the order of transmission from a designated processing result storage address. Hence, when the calculation result is sequentially read out by a read command from the processing result storage address, the calculation result is obtained in the transmission order of divided image data.

In step S1001, the arithmetic processing unit 203 confirms the number of divided image data generated in step S902. The arithmetic processing unit 203 sets the obtained number of divided image data as the number of calculation results to be read out. In steps S1002 to S1004, read processing of reading out a predetermined amount of calculation result is repeated. In this example, the predetermined amount of calculation result is a calculation result for one divided image data. In step S1002, the arithmetic processing unit 203 determines the combination of commands to be used to receive the calculation result. Such a combination of commands will also be referred to as a command group hereinafter, as in the description of FIG. 9. How to determine the combination of commands is based on the same concept as in step S903. The command group in the reception processing is formed by a read command and/or a multi-read command. In receiving a predetermined amount of calculation result, based on the predetermined amount and the time required for communication of commands, the combination of commands is formed such that reception of the predetermined amount of data is ended within the required time.

In step S1003, using the command group (the combination of commands) determined in step S1002, the arithmetic processing unit 203 executes read of calculation results from the detachable device 100 a plurality of times, and receives these. In step S1004, the arithmetic processing unit 203 compares the number of calculation results set in step S1001 with the total number of read calculation results. If these match, it is judged that all the calculation results are read out, and the process advances to step S1005 to perform post-processing of the image. If the numbers do not match, it is judged that an unreceived calculation result exists, and the process advances to step S1002 to read out the remaining calculation result. Note that the arithmetic processing unit 203 stores the combination of commands used for the reception, and selects a combination of commands in next step S1002 such that it does not match the stored combination of commands. In this way, the combination of commands that form the command group used for transmission is changed during transmission of the calculation results.

The imaging apparatus 110 confirms the transmission order of divided image data, and can determine which divided image data the calculation result received in step S1003 corresponds to. Hence, in step S1005, the arithmetic processing unit 203 superimposes the calculation result obtained by the processes of steps S1001 to S1004 described above on the original image, and distributes it from the distribution unit 204 to the network 120.

As described above, in the first embodiment, the imaging apparatus 110 transmits a plurality of divided image data obtained by dividing image data to the detachable device 100, and causes the arithmetic processing unit 412 of the detachable device 100 to perform arithmetic processing. At this time, a combination of a plurality of types of write commands is used to transmit the plurality of divided image data, and the combination is changed for each divided image data. Hence, it is difficult for a third party that does not know a predetermined code representing a break between divided image data or the size of divided image data as a target of arithmetic processing to discriminate the image written in the detachable device 100 by the imaging apparatus 110. Also, in this embodiment, when obtaining a calculation result, a combination of read commands, which is different for each calculation result, is used. Hence, the data size of the calculation result is hard to know, and it is possible to reduce the possibility that the contents of the calculation result read out by the imaging apparatus 110 are specified by a third party.

Second Embodiment

In the second embodiment, the transmission/reception procedure of an imaging apparatus 110 and a detachable device 100 and the effect thereof in a case in which divided image data transmission processing and calculation result reception processing described in the first embodiment are combined across a plurality of frames will be described. Note that the arrangements shown in the first embodiment and the control method and procedure of each of image transmission and calculation result reception also apply to the second embodiment.

<Transmission/Reception Processing Between Frames>

Figure 11:
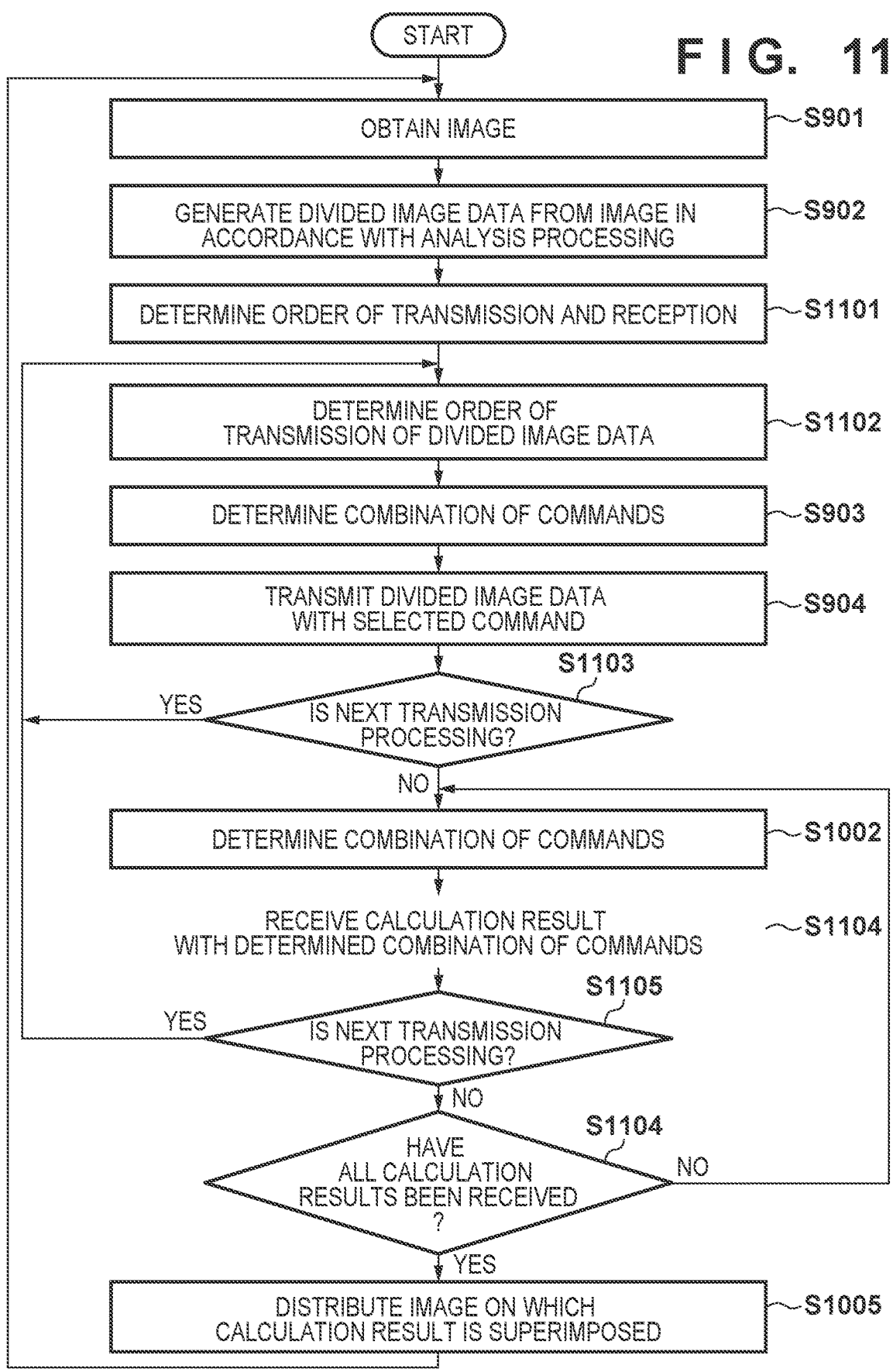
FIG. 11 is a flowchart showing transmission/reception processing of a plurality of frames according to the second embodiment.

FIG. 11 is a flowchart for explaining the transmission/reception operation of the imaging apparatus 110 according to the second embodiment. Transmission/reception processing of the imaging apparatus 110 and the detachable device 100 across a plurality of frames will be described below with reference to the flowchart shown in FIG. 11. Note that the same step numbers as in the first embodiment denote similar processes. The flowchart shown in FIG. 11 represents processing performed during steps S604 to S606 shown in FIG. 6. The processing shown in FIG. 11 starts from processing of transmitting an image (divided image data) that is the target of arithmetic processing.

In step S1101, the arithmetic processing unit 203 determines the order of transmission and reception. The detachable device 100 can store the data of a calculation result in the FPGA 402 or the storage unit 404. Hence, transmission of divided image data and reception of the calculation result need not always be performed as a set. Note that when determining the order of transmission and reception, consideration is made such that reception processing is executed in a state in which an unreceived calculation result concerning divided image data transmitted by the previous transmission processing exists in the storage unit 404.

In step S1102, the arithmetic processing unit 203 determines the order of transmission of a plurality of divided image data obtained by dividing an image, and specifies divided image data to be transmitted next based on the determined order. Note that the arithmetic processing unit 203 holds the information of the transmission order determined in step S1102 until step S1005. The arithmetic processing unit 203 determines a command group used to transmit the divided image data (step S903), and transmits the divided image data determined as the transmission target in step S1102 using the determined command group (step S904). In step S1103, the arithmetic processing unit 203 confirms the order of transmission/reception determined in step S1101, and judges whether the next processing is transmission processing or reception processing. If the next processing is transmission processing, the process returns to step S1102. On the other hand, if the next processing is reception processing, the process advances to step S1002.

In step S1002, the arithmetic processing unit 203 determines a combination of read commands that form a command group. In step S1104, the arithmetic processing unit 203 receives the calculation result from the detachable device 100 using the command group (the combination of read commands) determined in step S1002. The calculation result is received in the order (the transmission order of divided image data) determined in step S1102. The arithmetic processing unit 203 holds the information of the transmission order of divided image data determined in step S1102, and can judge, based on the information, which divided image data the calculation result received sequentially corresponds to.

In step S1105, the arithmetic processing unit 203 confirms the order of transmission/reception determined in step S1101, and judges whether the next processing is transmission processing or reception processing. If the next processing is transmission processing, the process returns to step S1102. On the other hand, if the next command is reception processing, the process advances to step S1004. In step S1004, the arithmetic processing unit 203 judges whether all calculation results have been received (for example, whether calculation results as many as the number of divided image data generated in step S902 have been received). If the calculation results have not been received, the process returns to step S1002, and the arithmetic processing unit 203 reads out the next calculation result.

Upon judging in step S1004 that all calculation results have been received, the process advances to step S1005. In step S1005, the arithmetic processing unit 203 refers to the transmission order of divided image data determined in step S1102, and associates the readout calculation result with each of the plurality of divided image data. In this way, the arithmetic processing unit 203 can appropriately superimpose the calculation result on the image obtained in step S901 and distribute it. After the image on which the calculation result is superimposed is distributed in step S1005, the process returns to step S901 to perform similar processing for the image of the next frame. The arithmetic processing unit 203 stores the order of transmission/reception and the transmission order of divided image data determined in the preceding frame. When performing processing for the image of the new frame, in steps S1101 and S1102, the arithmetic processing unit 203 determines the order of transmission/reception and the transmission order of divided image data such that these do not match the stored orders.

As described above, according to the second embodiment, the combination of write commands, the combination of read commands, the order of the image data transmission operation and the calculation result read operation, and the order of the position of divided image data transmitted to the detachable device 100 are changed. It is therefore difficult for a third party that does not confirm these to confirm the contents of data transmission/reception between the imaging apparatus 110 and the detachable device 100 even if the communication protocol is known.

Note that in the second embodiment, the combination of commands and the transmission order of divided image data are changed. However, the possibility that the transmission contents are analyzed by a third party can be reduced only by changing the transmission order of divided image data. In the first and second embodiments, an imaging apparatus has been exemplified as the electronic device to which the detachable device 100 is attached. However, the electronic device is not limited to this. In the above-described embodiments, a plurality of divided image data obtained by dividing image data have been described as divided data to be transmitted to the detachable device 100. However, the data is not limited to this. That is, an arrangement for obtaining, from data of a target of arithmetic processing, a plurality of divided data corresponding to units of processing of arithmetic processing and transmitting these suffices. The contents of data are not particularly limited.

As described above, according to the embodiments, it is possible to reduce the possibility that the communication contents between an electronic device and a device, which are connected using a known communication protocol, are confirmed by a third party.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-058306, filed Mar. 27, 2020, which is hereby incorporated by reference herein in its entirety.

What is claimed is:

1. An electronic device capable of attaching/detaching a device including an arithmetic processing unit, comprising:
an attachment mechanism for attaching/detaching the device including the arithmetic processing unit executing analysis processing on data;
one or more hardware processors; and
one or more memories which store instructions executable by the one or more hardware processors to cause the electronic device to perform at least:
dividing the data that is a processing target of the arithmetic processing unit to obtain a plurality of divided data;
determining a first command group that is a combination of a plurality of types of commands used to transmit each of the plurality of divided data to the device; and
transmitting the divided data using the first command group to the device including the arithmetic processing unit,
wherein in the determining, a combination of commands that form the first command group is changed between a case in which certain divided data of the plurality of divided data is transmitted and a case in which another divided data is transmitted.

2. The device according to claim 1, wherein the divided data corresponds to a unit of processing of the arithmetic processing unit.

3. The device according to claim 2, wherein the plurality of divided data have the same size.

4. The device according to claim 3, wherein the data is image data, and
in the dividing unit,
a plurality of divided images is generated by dividing the image data into images with a plurality of types of sizes based on a size and a position of an object in the image data, and
a plurality of divided image data obtained by making sizes of the plurality of divided images equal to a predetermined size are obtained as the plurality of divided data.

5. The device according to claim 2, wherein, in the dividing, information representing one of a start and an end of data are added to each of the plurality of divided data.

6. The device according to claim 1, wherein, in the determining, the first command group is determined by combining a plurality of types of commands complying with a predetermined communication standard.

7. The device according to claim 1, wherein, in the determining, based on a data amount of the divided data and a time required for communication of the commands, the combination of the commands that form the first command group is determined such that transmission of the divided data is ended within the required time.

8. The device according to claim 1, wherein the one or more memories store instructions executable by the one or more hardware processors to cause the electronic device to further perform: when transmitting a plurality of data as the processing target, changing a transmission order of the plurality of divided data by the transmitting unit for each data.

9. The device according to claim 8, wherein the one or more memories store instructions executable by the one or more hardware processors to cause the electronic device to further perform: holding the changed transmission order.

10. The device according to claim 1, wherein the one or more memories store instructions executable by the one or more hardware processors to cause the electronic device to further perform: reading out, from the device, a calculation result by the arithmetic processing unit.

11. The device according to claim 10, wherein the one or more memories store instructions executable by the one or more hardware processors to cause the electronic device to further perform:
when transmitting a plurality of data as the processing target, changing a transmission order of the plurality of divided data by the transmitting, for each data; and
holding the transmission order changed in the changing,
wherein the calculation result read out in the reading is associated with each of the plurality of divided data based on the transmission order.

12. The device according to claim 10, wherein
in the reading,
a second command group that is a combination of a plurality of types of commands used to read out a predetermined amount of data is determined,
calculation result is read out by the predetermined amount in the reading, using the second command group by the predetermined amount, and
the combination of the commands that form the second command group is changed during read of the predetermined amount of calculation result.

13. The device according to claim 12, wherein the predetermined amount of data is a calculation result obtained by processing one divided data by the arithmetic processing unit.

14. The device according to claim 12, wherein reception of calculation result by the predetermined amount using the second command group is performed during transmission of the plurality of divided data by transmission using the first command group.

15. An electronic device capable of attaching/detaching a device including a storage unit, comprising:
an attachment mechanism for attaching/detaching the device including the storage unit storing data and an arithmetic processing unit executing analysis processing on the data;
one or more hardware processors; and
one or more memories which store instructions executable by the one or more hardware processors to cause the electronic device to perform at least:
determining a command group that is a combination of a plurality of types of commands used to read out data from the storage unit; and
reading out data of a read target from the storage unit by executing read processing of reading out data from the device using a command of the command group a plurality of times,
wherein in the determining, the combination of the plurality of types of commands that form the command group is changed between the read processing of reading out certain data of the data of the read target and the read processing of reading out another data.

16. The device according to claim 15, wherein the read processing is processing of reading out the predetermined amount of data from the device, and
in the determining, based on a time required for communication of the predetermined amount of data and the commands, the combination of the commands that form the command group is determined such that reception of the predetermined amount of data is ended within the required time.

17. A control method of an electronic device capable of attaching/detaching a device including an arithmetic processing unit executing analysis processing on data, the method comprising:
dividing the data that is a processing target of the arithmetic processing unit to obtain a plurality of divided data;
determining a first command group that is a combination of a plurality of types of commands used to transmit each of the plurality of divided data to the device; and
transmitting the divided data using the first command group to the device including the arithmetic processing unit,
wherein in the determining, a combination of commands that form the first command group is changed between a case in which certain divided data of the plurality of divided data is transmitted and a case in which another divided data is transmitted.

18. A control method of an electronic device capable of attaching/detaching a device including a storage unit storing data and an arithmetic processing unit executing analysis processing on the data, the method comprising:
determining a command group that is a combination of a plurality of types of commands used to read out data from the storage unit; and
reading out data of a read target by executing read processing of reading out data from the device using the command group a plurality of times,
wherein in the determining, the combination of the plurality of types of commands that form the command group is changed between the read processing of reading out certain data of the data of the read target and the read processing of reading out another data.

19. A non-transitory computer-readable storage medium storing a program configured to cause a computer to execute a control method of an electronic device capable of attaching/detaching a device including an arithmetic processing unit executing analysis processing on the data, the method comprising:
dividing the data that is a processing target of the arithmetic processing unit to obtain a plurality of divided data;
determining a first command group that is a combination of a plurality of types of commands used to transmit each of the plurality of divided data to the device; and
transmitting the divided data using the first command group to the device including the arithmetic processing,
wherein in the determining, a combination of commands that form the first command group is changed between a case in which certain divided data of the plurality of divided data is transmitted and a case in which another divided data is transmitted.

20. A non-transitory computer-readable storage medium storing a program configured to cause a computer to execute a control method of an electronic device capable of attaching/detaching a device including a storage unit storing data and an arithmetic processing unit executing analysis processing on the data, comprising:
determining a command group that is a combination of a plurality of types of commands used to read out data from the storage unit; and
reading out data of a read target by executing read processing of reading out data from the device using the command group a plurality of times,
wherein in the determining, the combination of the plurality of types of commands that form the command group is changed between the read processing of reading out certain data of the data of the read target and the read processing of reading out another data.

* * * * *